US008504606B2

(12) United States Patent
Tandon

(10) Patent No.: US 8,504,606 B2
(45) Date of Patent: Aug. 6, 2013

(54) LEARNER FOR RESOURCE CONSTRAINED DEVICES

(75) Inventor: Gaurav Tandon, Redmond, WA (US)

(73) Assignee: Tegic Communications, Seattle, WA (US)

(*) Notice: Subject to any disclaimer, the term of this patent is extended or adjusted under 35 U.S.C. 154(b) by 839 days.

(21) Appl. No.: 11/392,186

(22) Filed: Mar. 28, 2006

(65) Prior Publication Data

US 2007/0106785 A1 May 10, 2007

Related U.S. Application Data

(60) Provisional application No. 60/734,840, filed on Nov. 9, 2005.

(51) Int. Cl.
*G06F 15/16* (2006.01)
(52) U.S. Cl.
USPC .......................................... 709/202; 709/203
(58) Field of Classification Search
USPC ......................................................... 709/202
See application file for complete search history.

(56) References Cited

U.S. PATENT DOCUMENTS

| 5,109,352 | A | | 4/1992 | O'Dell |
| 5,371,673 | A | * | 12/1994 | Fan ................................... 704/1 |
| 5,608,846 | A | * | 3/1997 | Mitsubuchi et al. ............ 706/59 |
| 5,848,396 | A | * | 12/1998 | Gerace ............................ 705/10 |
| 5,852,814 | A | * | 12/1998 | Allen .............................. 706/13 |
| 5,875,108 | A | * | 2/1999 | Hoffberg et al. ................ 700/17 |
| 5,946,375 | A | * | 8/1999 | Pattison et al. .......... 379/112.01 |
| 5,952,942 | A | | 9/1999 | Balakrishnan et al. |
| 6,009,444 | A | | 12/1999 | Chen |
| 6,018,738 | A | * | 1/2000 | Breese et al. ................. 707/749 |
| 6,054,941 | A | | 4/2000 | Chen |
| 6,104,317 | A | | 8/2000 | Panagrossi |
| 6,112,186 | A | * | 8/2000 | Bergh et al. .................... 705/10 |
| 6,169,538 | B1 | | 1/2001 | Nowlan et al. |
| 6,172,625 | B1 | | 1/2001 | Jin et al. |
| 6,182,070 | B1 | * | 1/2001 | Megiddo et al. ............. 707/694 |
| 6,202,058 | B1 | * | 3/2001 | Rose et al. ...................... 706/45 |

(Continued)

FOREIGN PATENT DOCUMENTS

JP H01-288926 11/1989

OTHER PUBLICATIONS

Avrim Blum (Machine Learning, 197).*
Avrim Blum (CMU, Machine Learning, 1997).*

(Continued)

*Primary Examiner* — Waseem Ashraf
(74) *Attorney, Agent, or Firm* — Michael A. Glenn; Glenn Patent Group

(57) ABSTRACT

Methods, apparatuses, and articles for registering votes to predict an attribute value for a received instance are described herein. In one embodiment, the registering is performed in a weighted manner based at least on a weight and predicted target values associated with at least one of one or more rules whose antecedent has been met. The meeting of the antecedent is determined based at least on one or more attributes values of one or more other attributes of the received instance. Further, determining whether the predicted target value for which votes are registered correctly predicted the attribute value of the received instance is performed. The associated weight of the rule is adjusted accordingly, for instance, by incrementing the weight if the predicted target value correctly predicted the attribute value of the received instance, and by decrementing the weight if the predicted target value incorrectly predicted the attribute value of the received instance.

14 Claims, 5 Drawing Sheets

U.S. PATENT DOCUMENTS

| | | | | |
|---|---|---|---|---|
| 6,204,848 | B1 | 3/2001 | Nowlan et al. | |
| 6,311,173 | B1* | 10/2001 | Levin et al. | 706/21 |
| 6,334,127 | B1* | 12/2001 | Bieganski et al. | 1/1 |
| 6,362,752 | B1 | 3/2002 | Guo et al. | |
| 6,370,513 | B1* | 4/2002 | Kolawa et al. | 705/10 |
| 6,424,743 | B1 | 7/2002 | Ebrahimi | |
| 6,438,579 | B1* | 8/2002 | Hosken | 709/203 |
| 6,502,118 | B1 | 12/2002 | Chatterjee | |
| 6,603,489 | B1* | 8/2003 | Edlund et al. | 715/780 |
| 6,636,836 | B1* | 10/2003 | Pyo | 705/26 |
| 6,655,963 | B1* | 12/2003 | Horvitz et al. | 434/236 |
| 6,686,852 | B1 | 2/2004 | Guo | |
| 6,711,290 | B2 | 3/2004 | Sparr et al. | |
| 6,757,544 | B2 | 6/2004 | Rangarajan et al. | |
| 6,801,659 | B1 | 10/2004 | O'Dell | |
| 6,801,909 | B2* | 10/2004 | Delgado et al. | 1/1 |
| 6,807,529 | B2 | 10/2004 | Johnson et al. | |
| 6,864,809 | B2 | 3/2005 | O'Dell et al. | |
| 6,873,990 | B2* | 3/2005 | Oblinger | 1/1 |
| 6,912,581 | B2 | 6/2005 | Johnson et al. | |
| 6,947,771 | B2 | 9/2005 | Guo et al. | |
| 6,955,602 | B2 | 10/2005 | Williams | |
| 6,956,968 | B1 | 10/2005 | O'Dell et al. | |
| 6,973,332 | B2 | 12/2005 | Mirkin et al. | |
| 6,982,658 | B2 | 1/2006 | Guo | |
| 6,983,216 | B2* | 1/2006 | Lam et al. | 702/119 |
| 7,057,607 | B2 | 6/2006 | Mayoraz et al. | |
| 7,075,520 | B2 | 7/2006 | Williams | |
| 7,095,403 | B2 | 8/2006 | Lyustin et al. | |
| 7,113,917 | B2* | 9/2006 | Jacobi et al. | 705/14.53 |
| 7,139,430 | B2 | 11/2006 | Sparr et al. | |
| 7,256,769 | B2 | 8/2007 | Pun et al. | |
| 7,257,528 | B1 | 8/2007 | Ritchie et al. | |
| 7,272,564 | B2 | 9/2007 | Phillips et al. | |
| 7,313,277 | B2 | 12/2007 | Morwing et al. | |
| 7,349,576 | B2 | 3/2008 | Holtsberg | |
| 7,389,235 | B2 | 6/2008 | Dvorak | |
| 7,437,001 | B2 | 10/2008 | Morwing et al. | |
| 7,466,859 | B2 | 12/2008 | Chang et al. | |
| 7,881,995 | B2* | 2/2011 | Grimberg | 705/35 |
| 2002/0018074 | A1* | 2/2002 | Buil et al. | 345/719 |
| 2002/0059202 | A1* | 5/2002 | Hadzikadic et al. | 707/3 |
| 2002/0065721 | A1* | 5/2002 | Lema et al. | 705/14 |
| 2002/0131565 | A1* | 9/2002 | Scheuring et al. | 379/88.19 |
| 2002/0147695 | A1* | 10/2002 | Khedkar et al. | 706/15 |
| 2003/0023426 | A1 | 1/2003 | Pun et al. | |
| 2003/0037041 | A1* | 2/2003 | Hertz | 707/1 |
| 2003/0054830 | A1 | 3/2003 | Williams et al. | |
| 2003/0097186 | A1* | 5/2003 | Gutta et al. | 700/1 |
| 2003/0144830 | A1 | 7/2003 | Williams | |
| 2003/0149675 | A1* | 8/2003 | Ansari et al. | 706/2 |
| 2003/0152904 | A1* | 8/2003 | Doty, Jr. | 434/350 |
| 2004/0076936 | A1* | 4/2004 | Horvitz et al. | 434/236 |
| 2004/0093290 | A1* | 5/2004 | Doss et al. | 705/35 |
| 2004/0153963 | A1 | 8/2004 | Simpson et al. | |
| 2004/0153975 | A1 | 8/2004 | Williams et al. | |
| 2004/0181512 | A1* | 9/2004 | Burdick et al. | 707/3 |
| 2005/0017954 | A1* | 1/2005 | Kay et al. | 345/169 |
| 2005/0091098 | A1* | 4/2005 | Brodersen et al. | 705/8 |
| 2005/0114284 | A1* | 5/2005 | Wrobel et al. | 707/1 |
| 2005/0114770 | A1 | 5/2005 | Sacher et al. | |
| 2005/0137819 | A1* | 6/2005 | Lam et al. | 702/119 |
| 2005/0165596 | A1* | 7/2005 | Adar et al. | 703/22 |
| 2005/0165782 | A1* | 7/2005 | Yamamoto | 707/7 |
| 2006/0010217 | A1* | 1/2006 | Sood | 709/206 |
| 2006/0015421 | A1* | 1/2006 | Grimberg | 705/35 |
| 2006/0026203 | A1* | 2/2006 | Tan et al. | 707/104.1 |
| 2006/0047650 | A1* | 3/2006 | Freeman et al. | 707/5 |
| 2006/0129928 | A1 | 6/2006 | Qiu | |
| 2006/0136408 | A1 | 6/2006 | Weir et al. | |
| 2006/0143093 | A1* | 6/2006 | Brandt et al. | 705/26 |
| 2006/0155536 | A1 | 7/2006 | Williams et al. | |
| 2006/0158436 | A1 | 7/2006 | LaPointe et al. | |
| 2006/0173807 | A1 | 8/2006 | Weir et al. | |
| 2006/0193519 | A1 | 8/2006 | Sternby | |
| 2006/0224259 | A1* | 10/2006 | Buil et al. | 700/94 |
| 2006/0236239 | A1 | 10/2006 | Simpson et al. | |
| 2006/0237532 | A1* | 10/2006 | Scott-Leikach et al. | 235/383 |
| 2006/0239560 | A1 | 10/2006 | Sternby | |
| 2006/0247915 | A1* | 11/2006 | Bradford et al. | 704/1 |
| 2006/0266830 | A1* | 11/2006 | Horozov et al. | 235/386 |
| 2007/0083504 | A1* | 4/2007 | Britt et al. | 707/5 |
| 2007/0094718 | A1 | 4/2007 | Simpson | |
| 2007/0203879 | A1 | 8/2007 | Templeton-Steadman et al. | |
| 2007/0276814 | A1 | 11/2007 | Williams | |
| 2007/0285397 | A1 | 12/2007 | LaPointe et al. | |
| 2008/0103859 | A1* | 5/2008 | Yokota et al. | 705/7 |
| 2008/0130996 | A1 | 6/2008 | Sternby | |

OTHER PUBLICATIONS

WeightedMajority_CalendarSchedulingDomain, Avrim Blum, Machine learning 26, 1997.*

International Preliminary Report on Patentability and Written Opinion from PCT/US2006-042622, mailed May 22, 2008, 7 pgs.

Ishibuchi H. et al, "Voting in Fuzzy Rule-Based Systems for Pattern Classification Problems", Fuzzy Sets and Systems, Elsevier Science Publishers, Amsterdam, NL, LNKD-DOI:10.1016/S0165-0114(98) 00223-1, vol. 103, No. 2, Apr. 16, 1999, pp. 223-238, XP004157916, ISSN: 0165-0114.

Davison, Brian D. and Haym Hirsh, "Predicting Sequences of User Actions" Proceedings of AAAI/ICML 1998 Workshop on Predicting the Future: AI Approaches to Time-Series Analysis, Jul. 31, 1998, XP002597337.

Bark Cheung Chiu and Geoffrey I. Webb, "Using Decision Trees for Agent Modeling: Improving Prediction Performance", User Modeling and User-Adapted Interaction, vol. 8, No. 1-2, Dec. 31, 1998, pp. 131-152, XP002597338 DOI: 10.1023/A:1008296930163.

Yingjiu Li et al, "Discovering Calendar-Based Temporal Association Rules" Temporal Representation and Reasoning, 2001, Time 2001, Proceedings. 8th International Symposium on Jun. 14-16, 2001, pp. 111-118, XP010548129, ISBN 978-0-7695-1107-08.

Gangardiwala A. et al, "Dynamically Weighted Majority Voting for Incremental Learning and Comparison of Three Boositng Based Approaches", Neural Networks 2005, Proceedings 2005, IEEE International Joint Conference, Montreal, Que. Canada Jul. 31-Aug. 4, 2005. Piscataway, MJ, USA, IEEE, US LNKD-DOI:10.1109/IJCNN.2005.1556012, vol. 2, Jul. 31, 2005, pp. 1131-1136, XP010866158, ISBN: 978-07803-9048-5.

\* cited by examiner if sponsor-attendees=mitchell and department-attendees=scs
then location = weh5309, weh5311, oakland if group-name=cs-faculty then location = weh4623 if department-attendees=scs and position-attendees=grad-student and
course-name=nil
then location = weh5309, weh5307, unknown if seminar-type=ai then location = weh4623, weh5409 if course-name=ml-course then location = weh4623, weh4601, unknown

FIG. 3

LEARNER FOR RESOURCE CONSTRAINED DEVICES

RELATED APPLICATIONS

The present application claims priority to U.S. Provisional Patent Application No. 60/734,840, entitled "A Learner for Resource Constrained Devices," filed on Nov. 9, 2005. The specification of the 60/734,840 provisional application is hereby fully incorporated by reference.

FIELD OF THE INVENTION

The present invention relates to the field of data processing, in particular, to methods and apparatuses for a learner for resource constrained devices.

BACKGROUND OF THE INVENTION

Many machine learning and data mining techniques are designed to operate in devices with sufficient resources to handle large amounts of data and models. With the popularity of mobile devices like smartphones and personal digital assistants (PDAs), the number of applications running on these devices is also increasing rapidly. These devices introduce severe storage and time constraints for any learning algorithm. Typically, a fast online algorithm is required. Moreover, the model needs to be updated continuously since the instance space is limited.

For example, mobile context learning has been pursued under the banners of human-computer interaction (HCI), ubiquitous and pervasive computing. Context is inferred from user activity, the environment, and the state of the mobile device. The model needs to be updated upon receipt of new data. These devices, unlike desktops, do not enjoy abundance of resources and no learner has been designed with the constrained environment of these devices in mind.

BRIEF DESCRIPTION OF THE DRAWINGS

The present invention will be described by way of exemplary embodiments, but not limitations, illustrated in the accompanying drawings in which like references denote similar elements, and in which:

FIG. 3 illustrates exemplary variable length rules comprising a part of a ruleset of the present invention, in accordance with various embodiments;

DETAILED DESCRIPTION OF EMBODIMENTS OF THE INVENTION

Illustrative embodiments of the present invention include, but are not limited to, methods and apparatuses for registering one or more votes to predict a value for an attribute of a received instance. In various embodiments, the registering is performed in a weighted manner based at least in part on a weight and predicted target values associated with at least one of one or more rules whose antecedent has been determined to have been met. In various embodiments, the meeting of the antecedent is determined based at least in part on one or more attributes values of one or more other attributes of the received instance. In various embodiments, the invention further includes determining whether the predicted target value for which one or more votes are registered correctly predicted the attribute value of the received instance, and adjusting the associated weight of the rule accordingly. In various embodiments, the adjustment may include incrementing the weight if the predicted target value for which the one or more votes are registered correctly predicted the attribute value of the received instance, and decrementing the weight if the predicted target value for which the one or more votes are registered incorrectly predicted the attribute value of the received instance.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Figure 1:
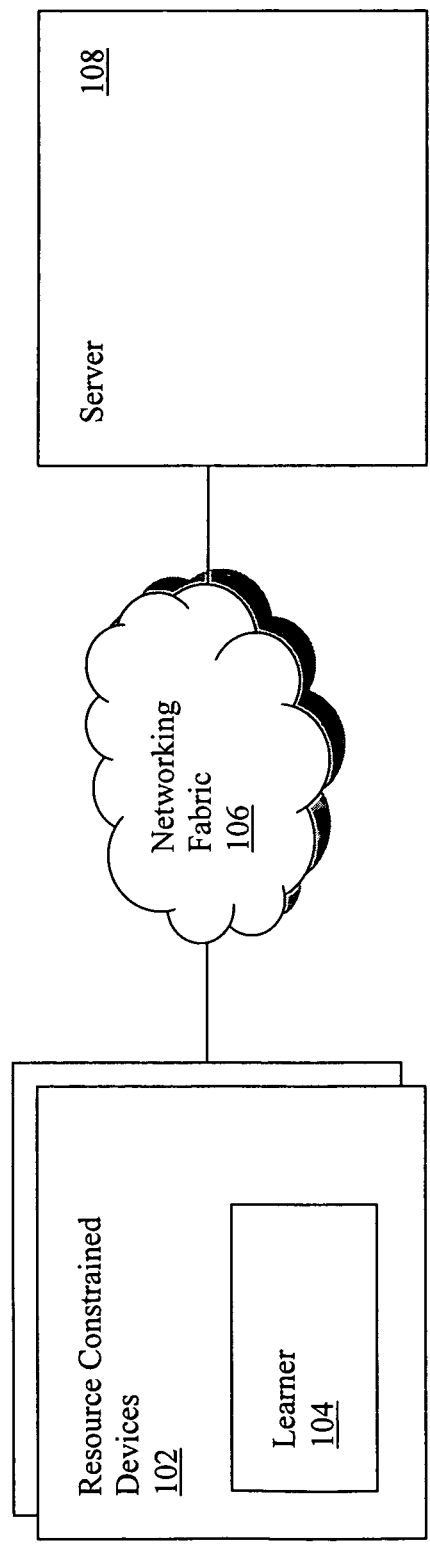
FIG. 1 illustrates an overview of the present invention, in accordance with various embodiments.

FIG. 1 illustrates an overview of the present invention, in accordance with various embodiments. As illustrated, a resource constrained device 102 may include a learner 104, the learner 104 enhancing or coupled to one or more applications (not shown) of the resource constrained device. The resource constrained device 102 may additionally be capable of communicating in a wired or wireless fashion over one or more networking fabrics, such as networking fabric 106. Networking fabric 106 may facilitate device 102 in communicating with a server 108. The server, in some embodiments, is capable of performing some or all of the operations and/or storage of learner 104.

Figure 4:
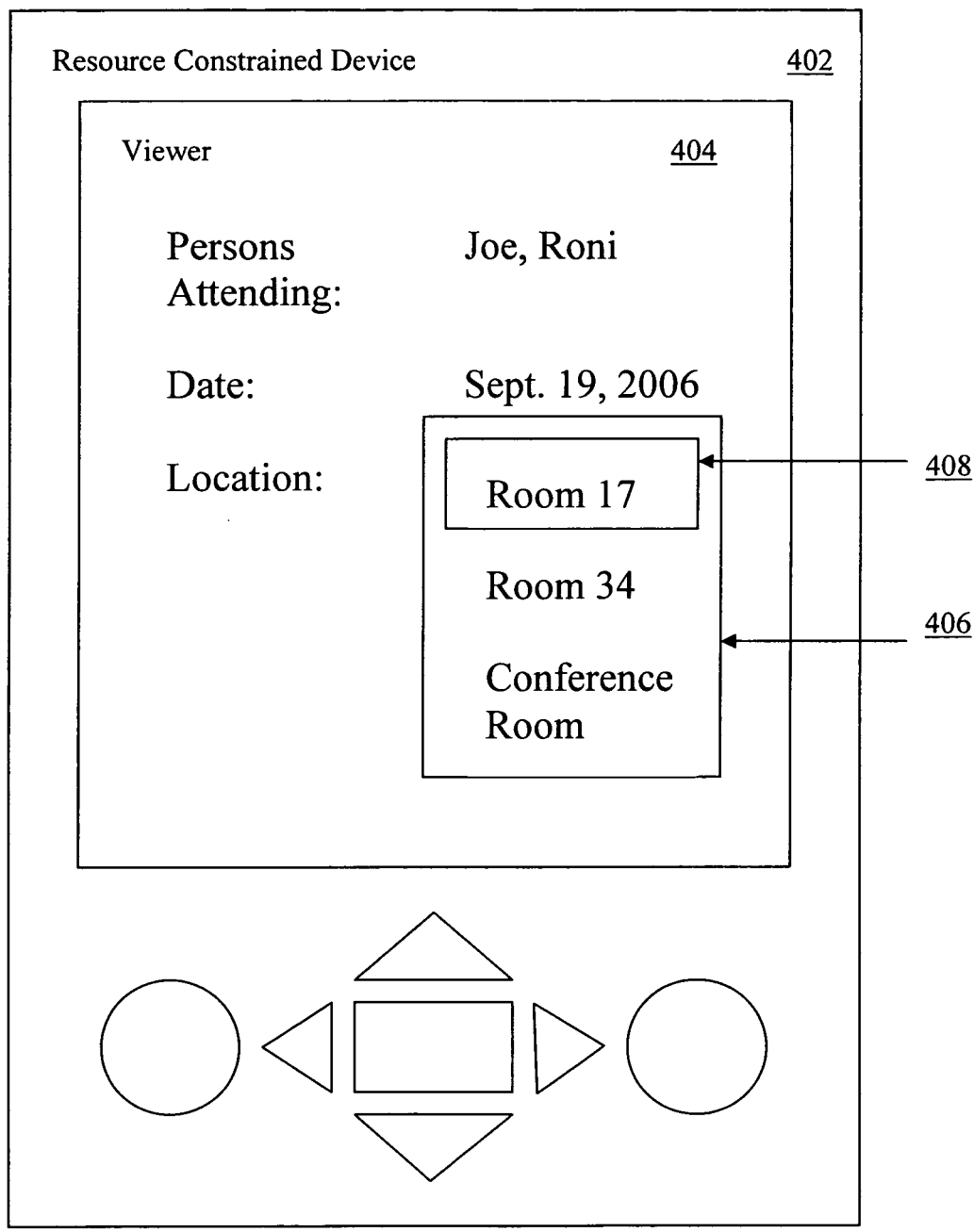
FIG. 4 illustrates a viewer of a resource constrained device configured in accordance with an embodiment of the present invention, presenting the target values predicted by the learner to a user.

In some embodiments, the resource constrained device 102 may be any sort of computing device known in the art, including smartphones, PDAs, and mobile devices, as well as numerous other computing systems. The device 102 may have a viewer, as is shown in FIG. 4, as well as keys, buttons, or a touch screen for input. In some embodiments, device 102 may have no component input mechanisms and/or viewer, and may rely on coupling to external devices to perform its operations. Also, the resource constrained device 102 may have one or more applications, implemented as either software or hardware, and the applications may be enhanced with or communicatively coupled to a learner 104 of the device 102. The application(s) may be of any sort known in the art. The learner 104 may be any sort of process or application, implemented as software or hardware, and may be implemented as a part of the application(s) that the leaner 104 may be enhancing.

Referring again to FIG. 1, the device may have one or more connections to one or more networking fabrics, such as networking fabric 106. The networking fabric 106 may, in some embodiments, be a wireless network such as a PCS, cellular, or 802.11 network, may be a wired, Ethernet network, or may be a Bluetooth network. Additionally, networking fabric 106 may rely on TCP/IP, RDMA, ATM, or any other communication protocol known in the art.

In various embodiments, server 108 may comprise any sort of computing device known in the art, such as a workstation, server, mainframe, or PC. The server 108 may be capable of receiving requests from a client of device 102 and of answering some or all of such requests. As shown, the server may be capable of performing some or all of the below described operations or storage of learner 104.

As illustrated, learner 104 may generate one or more rules by randomly selecting matching attribute values of one or more instances, first choosing the one or more instances randomly based on matching target values. In various embodiments, an instance may represent any logical concept composed of a plurality of attributes. For example, the logical concept "meeting" might be composed of attributes such as attendees, date, time, and location. Each attribute may then have one or more associated attribute values. Thus, the attribute "attendees" may be associated with the attribute values "Rene" and "Pascal." A plurality of such instances may be stored on resource constrained device 102, in some embodiments as tables of a database or as data structures of a file. In other embodiments, instances may instead be stored on server 108 and retrieved from server 108. Retrieval of instances from server 108 or from storage of device 102 may be based on one or more target values. Instances having a target value as an attribute value may comprise an instance space, and a number of instances may be randomly chosen from the instance space. For example, if "Conference Room" is a target value, the instances having "Conference Room" as an attribute value may comprise an instance space. A number of instances may then be randomly chosen from the instance space, such as "Lunch," "Meeting," and "Seminar," each instance having "Conference Room" as an attribute value, perhaps of an attribute such as "Location."

In some embodiments, learner 104 may then generate one or more rules by randomly selecting matching attribute values of the one or more randomly selected instances, the motivation being that matching attribute values may capture the correlation between the various attributes of the randomly selected one or more instances. The rules constructed may have an antecedent comprised of one or more attributes, each attribute associated with one or more attribute values. The rules may also include a consequent comprising a target and one or more target values associated with the target. In some embodiments, rules may be constructed in an "if-then" form, with "if" beginning the antecedent, and "then" beginning the consequent. An exemplary rule of such embodiments is "if sponsor-attendees=mitchell and department-attendees=scs then location=weh5309, weh5311, oakland." In this example, the antecedent is comprised of two attributes, "sponsor-attendees" and "department-attendees", with each attribute having one associated attribute value, and the consequent is comprised of a target, "location", the target having three associated target values. In some embodiments, rules may have fewer or more attributes and/or attribute values comprising the antecedent, and fewer or more target values. Accordingly, rules generated by learner 104 may be variable length rules. Exemplary variable length rules are illustrated by FIG. 3 and are described in further detail below.

The generated rules may comprise a ruleset, and may be stored in storage of the resource constrained device 102 or on server 108, the server 108 in some embodiments generating the rules. The rules may be implemented as classes of a programming language or may have their component attributes, attribute values, targets, and target values stored in a table of a database or in a data structure of a file, facilitating dynamic creation of the rules on an as-needed basis.

As shown, after forming the rules, learner 104 may remove redundant rules. In removing redundant rules, more general rules may be preferred to more specific rules.

In various embodiments, learner 104 may then update the rules over the above described instance space, incorporating attribute values and target values not present in the randomly chosen one or more instances. For example, a rule initially formed as "if date=120205 and personnel=rpe, ata then location=Conference Room" may be updated to include additional attribute values of an instance found in the instance space. Thus, if an instance has date, personnel, and location as attributes, but has an additional attribute value associated with personnel, "khf," then the rule may be updated as "if date=120205 and personnel=rpe, ata, khf then location=Conference Room."

Upon generating and updating the rules, learning 104 may associate a weight with each rule. In some embodiments, each rule is initially assigned the same weight. For example, upon initialization, each rule may be assigned a weight of "one." The weight may be a feature of the rule stored with the rule. For example, if the rule is a class, the weight may be a member variable of that class. If the rule is a table, the weight may be a field of the table. In alternate embodiments, the weights and rule may be stored apart, with rules stored on resource constrained device 102, and rules on server 108, or visa versa.

In some embodiments, additional features of a rule or its values may be stored with the rule and/or the weight. For example, learner 104 may count the number of times each target value is predicted.

As mentioned, the selected operations of choosing instances, forming rules, removing redundant rules, updating the rules, and associating each rule with a weight, may be performed entirely or in part on server 108. In some embodiments, however, each and every one of the above selected operations may be performed on resource constrained device 102. The above described rules facilitate the storage of a minimal amount of instance data by predicting attribute values, by updating rules, and by removing rules that inaccurately predict attribute values, these operations described in greater detail below. Also, by keeping only those rules which accurately predict values, learner 104 ensures that the maintained ruleset is compact.

As illustrated, once rules have been generated and updated, learner 104 may wait for a new instance. The new instance may be received by an application of resource constrained device 102, the application enhanced with an embodiment of the learner 104. Learner 104 may be used with any sort of application. For purposes of simplifying the following description, reference will be made to an exemplary calendar application enhanced with learner 104. However, in alternate embodiments, any number of applications may be enhanced with learner 104.

In some embodiments, a calendar application may operate on resource constrained device 102. After forming the rules or receiving them from server 108, an executing calendar application may wait to receive instances as input. Upon receiving a new instance, then, learner 104 may evaluate the instance in light of the rules. For example, a user of the calendar application might create a new meeting object to be displayed by the calendar. To create a meeting, the calendar application may require a user to enter at least a date, a time, an attendee, and a location. The creation of a new meeting object for a calendar may thus be considered the receipt of a new instance by the calendar application, and in turn by the learner 104.

Prior to checking rules of the ruleset, the learner 104 may determine which attribute of the new instance is the target which the rules will be used to predict one or more values for. In some embodiments, the target may be predetermined. For example, if the new instance is a meeting and a user must enter values for three attributes to store the meeting as an object of the calendar, the last attribute for which the user must enter a value may be considered the target, and one or more values may be predicted to the user for that attribute/target. In such embodiments, the rules may be checked after the user has entered values for the attributes prior to the target. In alternate embodiments, each attribute of the new instance may be iteratively treated as a target, with the rules being checked for each attribute of the new instance. For the first attribute, when no attribute values have been entered, and, thus, none of the rules may be met, the learner 104 may, for example, check all rules for values associated with the first attribute, and return either the most frequently predicted value or a list of some or all of the values.

In checking each rule, learner 104 may first determine which rules are comprised of attributes matching the attributes of the new instance for which values have been entered. Referring to the above example of a new meeting, if a user has entered values for date, time, and attendees, the learner 104 may first search the ruleset for rules whose antecedents are comprised of some or all of those three attributes. Of the rules found to match, the attribute values of the rules' antecedents are compared to the attribute values of the new instance. In some embodiments, only rules whose antecedents have all the same values as the new instance may have votes registered for them. In other embodiments, rules having one or more matching attribute values may also have votes registered for them.

In various embodiments, the number of votes registered for each rule may correspond to the weight of each rule, with each rule voting its full weight. For example, a rule with a weight of one may have one vote registered on its behalf, and a rule with a weight of three may have three votes registered on its behalf. In some embodiments, where a rule has more than one target value present in its consequent, all its votes may be registered for its most frequently voted target value. In other embodiments, votes may be cast for each of a rule's target values, with each vote cast equal to the weight of each rule multiplied by the fractional frequency of each target value. For example, if a rule has a weight of six and predicts three target values, "conference room," "room 417," and "room 321," and the values have corresponding frequencies of one, four, and one, then one vote may be cast for "conference room" (weight of six times fractional frequency of one-sixth equals one vote), four for "room 417," and one for "room 321." In yet other embodiments, some combination of the above two methods of vote registering may be used.

As illustrated, once votes have been registered, the learner 104 may aggregate the votes and predict one or more target values to a user of the resource constrained device 102. In some embodiments, the learner 104 may aggregate the votes registered on behalf of the rules, and predict only one value, the value receiving the highest plurality of votes. In other embodiments, the learner 104 may aggregate the votes and predict a plurality of values corresponding to the values receiving the highest pluralities of votes. The number of predictions made for a target may vary from embodiment to embodiment, and may be determined by a user- or program-defined threshold metric.

The predicted value or values may then be presented to a user of the resource constrained device 102, in some embodiments through a viewer of device 102, such as the viewer depicted by FIG. 4. The device 102 and calendar application may work in conjunction to facilitate a user in selecting one of the one or more predicted values, or in selecting to enter a value different from the value(s) predicted. The user may enter such a different value by any method known in the art, limited only by the hardware and software of embodiments of the resource constrained device 102 and the application.

Referring again to FIG. 1, the learner 104 may adjust the weight of one or more of the rules and/or update or remove one or more of the rules based at least on whether the local prediction of each rule was correct. After receiving the user's input, the learner 104 may determine, for each rule, whether the rule correctly predicted the target value chosen or entered by the user.

In some embodiments, the learner 104 may decrease the weight of a rule if the local prediction by that rule is incorrect, irrespective of the correctness of the global outcome. The learner 104, may, for example, decrement the weight of the rule by half its total weight. Further, when the local prediction is correct but the global outcome is incorrect, the learner 104 may measure the vote deficit for the actual prediction. After that, the learner 104 may increase the weights for rules that had the correct local prediction. In one embodiment, the weights of the correct-predicting rules are increased equally. This may boost the vote for the correct target value.

Additionally, when a rule (and the global outcome) predicts correctly, the learner 104 may increment the weight of the correctly predicting rules conservatively. Such an embodiment conjectures that this reward raises the confidence (weight) of the rule(s) for future predictions. In various embodiments, 0.1 is employed as the reward value. In other embodiments, different reward values may be employed. Liberally rewarding the rules eventually may lead to a drop in the performance, so this parameter may be selected carefully. Moreover, experiments appear to suggest a small linear increase in weight performs much better than exponential increase. In various embodiments, if the weight of any rule falls below a user-defined threshold, the rule may be removed from the ruleset.

In some embodiments, if the antecedent of any rule matches the current instance but the target value selected or provided by the user is not present in the consequent, the learner 104 may update the rule by replacing the target value having the lowest frequency of correctly predicting an outcome with the current, user selected/provided target value. Further, in various embodiments, if the prediction is incorrect, the learner 104 may update the instance space by replacing the target value having the lowest frequency of correctly predicting an outcome with the current, user selected/provided target value. New rules may be generated in the same way as the initial rules, and redundancy may be removed. New rules may each be assigned a weight, for example, a weight of one.

Learner 104 may then use this updated ruleset for subsequent instances. The ruleset is thus updated incrementally.

Experimental usage of the learner 104 has shown that at a relatively low cost in accuracy, a relatively significant improvement in the reduction in storage requirements may be realized. Further, even in this reduced storage environment, the learner 104 may execute at relatively high rate, making it appropriate for online usage.

Figure 2:
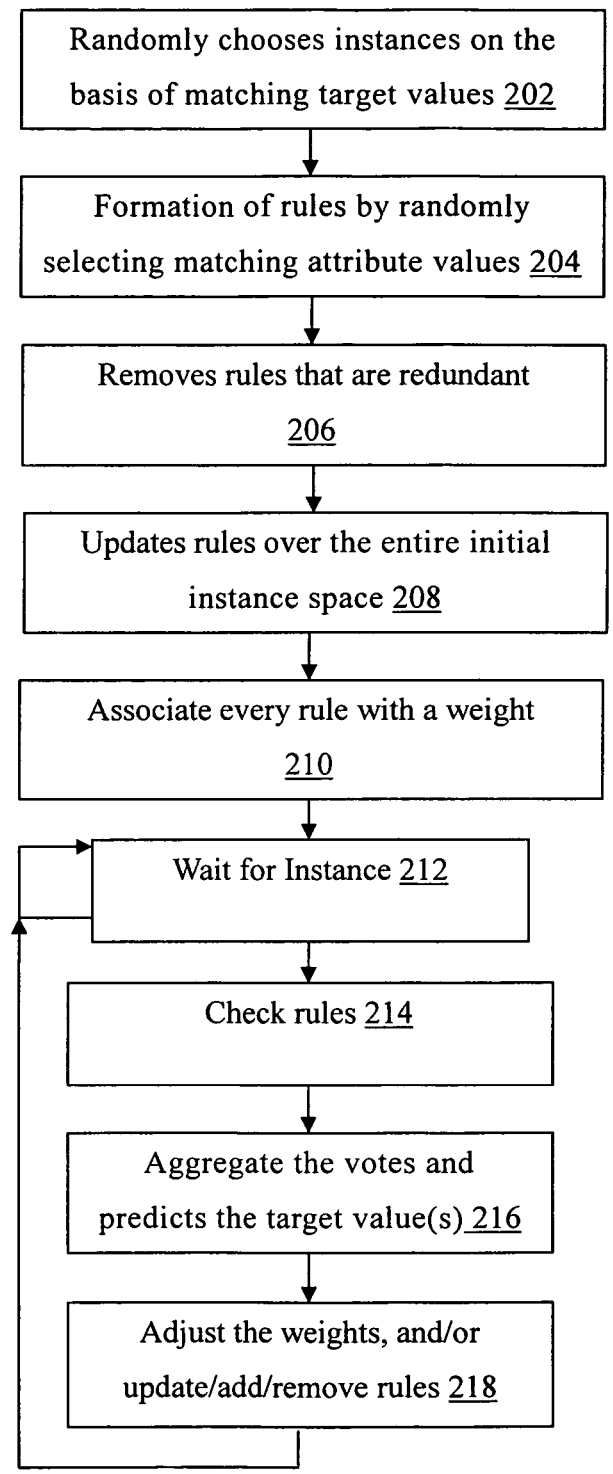
FIG. 2 illustrates a flowchart view of selected operations of the present invention, in accordance with various embodiments.

FIG. 2 illustrates a flowchart view of selected operations of the present invention, in accordance with various embodiments. As illustrated, a learner method of an embodiment of the present invention may generate one or more rules by randomly selecting matching attribute values of one or more instances, block 204, first choosing the one or more instances randomly based on matching target values, block 202. In various embodiments, an instance may represent any logical concept composed of a plurality of attributes. For example, the logical concept "meeting" might be composed of attributes such as attendees, date, time, and location. Each attribute may then have one or more associated attribute values. Thus, the attribute "attendees" may be associated with the attribute values "Rene" and "Pascal." A plurality of such instances may be stored on a resource constrained device, in some embodiments as tables of a database or as data structures of a file. In other embodiments, instances may instead be stored on a server and retrieved from that server. Retrieval of instances from a server or storage of the resource constrained device may be based on one or more target values. Instances having a target value as an attribute value may comprise an instance space, and a number of instances may be randomly chosen from the instance space, block 202. For example, if "Conference Room" is a target value, the instances having "Conference Room" as an attribute value may comprise an instance space. A number of instances may then be randomly chosen from the instance space, such as "Lunch," "Meeting," and "Seminar," each instance having "Conference Room" as an attribute value, perhaps of an attribute such as "Location."

In some embodiments, the learner method may then generate one or more rules by randomly selecting matching attribute values of the one or more randomly selected instances, block 204, the motivation being that matching attribute values may capture the correlation between the various attributes of the randomly selected one or more instances. The rules constructed may have an antecedent comprised of one or more attributes, each attribute associated with one or more attribute values. The rules may also include a consequent comprising a target and one or more target values associated with the target. In some embodiments, rules may be constructed in an "if-then" form, with "if" beginning the antecedent, and "then" beginning the consequent. An exemplary rule of such embodiments is "if sponsor-attendees=mitchell and department-attendees=scs then location=weh5309, weh5311, oakland." In this example, the antecedent is comprised of two attributes, "sponsor-attendees" and "department-attendees", with each attribute having one associated attribute value, and the consequent is comprised of a target, "location", the target having three associated target values. In some embodiments, rules may have fewer or more attributes and/or attribute values comprising the antecedent, and fewer or more target values. Accordingly, rules generated by embodiments of the learner method may be variable length rules. Exemplary variable length rules are illustrated by FIG. 3 and are described in further detail below.

The generated rules may comprise a ruleset, and may be stored in storage of the resource constrained device or on a server, the server in some embodiments generating the rules. The rules may be implemented as classes of a programming language or may have their component attributes, attribute values, targets, and target values stored in a table of a database or in a data structure of a file, facilitating dynamic creation of the rules on an as-needed basis.

As shown, after forming the rules, the learner method may remove redundant rules, block 206. In removing redundant rules, more general rules may be preferred to more specific rules.

In various embodiments, the learner method may then update the rules over the above described instance space, block 208, incorporating attribute values and target values not present in the randomly chosen one or more instances. For example, a rule initially formed as "if date=120205 and personnel=rpe, ata then location=Conference Room" may be updated to include additional attribute values of an instance found in the instance space. Thus, if an instance has date, personnel, and location as attributes, but has an additional attribute value associated with personnel, "khf," then the rule may be updated as "if date=120205 and personnel=rpe, ata, khf then location=Conference Room."

Upon generating and updating the rules, the learning method may associate a weight with each rule, block 210. In some embodiments, each rule is initially assigned the same weight. For example, upon initialization, each rule may be assigned a weight of "one." The weight may be a feature of the rule stored with the rule. For example, if the rule is a class, the weight may be a member variable of that class. If the rule is a table, the weight may be a field of the table. In alternate embodiments, the weights and rule may be stored apart, with rules stored on a resource constrained device, and rules on a server, or visa versa.

In some embodiments, additional features of a rule or its values may be stored with the rule and/or the weight. For example, the learner method may count the number of times each target value is predicted.

As mentioned, the selected operations of choosing instances, block 202, forming rules, block 204, removing redundant rules, block 206, updating the rules, block 208, and associating each rule with a weight, block 210, may be performed entirely or in part on a server. In some embodiments, however, each and every one of the above selected operations may be performed on a resource constrained device. The above described rules facilitate the storage of a minimal amount of instance data by predicting attribute values, by updating rules, and by removing rules that inaccurately predict attribute values, these operations described in greater detail below. Also, by keeping only those rules which accurately predict values, the learner method ensures that the maintained ruleset is compact.

As illustrated, once rules have been generated and updated, the learner method may wait for a new instance, block 212. The new instance may be received by an application of a resource constrained device, the application enhanced with an embodiment of the learner method of the present invention. Learner methods may be used with any sort of application. An application may benefit from enhancement or communicative coupling to a process or device implementing a learning method by requiring the storage of less data. For purposes of simplifying the following description, reference will be made to an exemplary calendar application enhanced with an embodiment of the learner method. However, in alternate embodiments, any number of applications may be enhanced with the learner method.

In some embodiments, a calendar application may operate on a resource constrained device, such as the device described above. After forming the rules or receiving them from a server, an executing calendar application may wait to receive instances as input, block 212. Upon receiving a new instance, then, the learner method of the calendar application may evaluate the instance in light of the rules, block 214. For example, a user of the calendar application might create a new meeting object to be displayed by the calendar. To create a meeting, the calendar application may require a user to enter at least a date, a time, an attendee, and a location. The creation of a new meeting object for a calendar may thus be considered the receipt of a new instance by the calendar application.

Prior to checking rules of the ruleset, block 214, a learner method of the calendar application may determine which attribute of the new instance is the target which the rules will be used to predict one or more values for. In some embodiments, the target may be predetermined. For example, if the new instance is a meeting and a user must enter values for three attributes to store the meeting as an object of the calendar, the last attribute for which the user must enter a value may be considered the target, and one or more values may be predicted to the user for that attribute/target. In such embodiments, the rules may be checked, block 214, after the user has entered values for the attributes prior to the target. In alternate embodiments, each attribute of the new instance may be iteratively treated as a target, with the rules being checked, block 214, for each attribute of the new instance. For the first attribute, when no attribute values have been entered, and, thus, none of the rules may be met, a learner method of the calendar may, for example, check all rules for values associated with the first attribute, and return either the most frequently predicted value or a list of some or all of the values.

In checking each rule, block 214, a learner method may first determine which rules are comprised of attributes matching the attributes of the new instance for which values have been entered. Referring to the above example of a new meeting, if a user has entered values for date, time, and attendees, the method may first search the ruleset for rules whose antecedents are comprised of some or all of those three attributes. Of the rules found to match, the attribute values of the rules' antecedents are compared to the attribute values of the new instance. In some embodiments, only rules whose antecedents have all the same values as the new instance may have votes registered for them. In other embodiments, rules having one or more matching attribute values may also have votes registered for them.

In various embodiments, the number of votes registered for each rule may correspond to the weight of each rule, with each rule voting its full weight. For example, a rule with a weight of one may have one vote registered on its behalf, and a rule with a weight of three may have three votes registered on its behalf. In some embodiments, where a rule has more than one target value present in its consequent, all its votes may be registered for its most frequently voted target value. In other embodiments, votes may be cast for each of a rule's target values, with each vote cast equal to the weight of each rule multiplied by the fractional frequency of each target value. For example, if a rule has a weight of six and predicts three target values, "conference room," "room 417," and "room 321," and the values have corresponding frequencies of one, four, and one, then one vote may be cast for "conference room" (weight of six times fractional frequency of one-sixth equals one vote), four for "room 417," and one for "room 321." In yet other embodiments, some combination of the above two methods of vote registering may be used.

As illustrated, once votes have been registered, the learner method may aggregate the votes and predict one or more target values to a user of the resource constrained device, block 216. In some embodiments, the learner method may aggregate the votes registered on behalf of the rules, and predict only one value, the value receiving the highest plurality of votes. In other embodiments, the learner method may aggregate the votes and predict a plurality of values corresponding to the values receiving the highest pluralities of votes. The number of predictions made for a target may vary from embodiment to embodiment, and may be determined by a user or program defined threshold metric.

The predicted value or values may then be presented to a user of the resource constrained device, in some embodiments through a viewer of the device, such as the viewer depicted by FIG. 4. The device and calendar application may work in conjunction to facilitate a user in selecting one of the one or more predicted values, or in selecting to enter a value different from the value(s) predicted. The user may enter such a different value by any method known in the art, limited only by the hardware and software of embodiments of the resource constrained device and application.

Referring again to FIG. 2, the learner method may adjust the weight of one or more of the rules and/or update or remove one or more of the rules based at least on whether the local prediction of each rule was correct, block 218. After receiving the user's input, the learner method may determine, for each rule, whether the rule correctly predicted the target value chosen or entered by the user.

In some embodiments, the learner method may decrease the weight of a rule if the local prediction by that rule is incorrect, irrespective of the correctness of the global outcome. The learner method, may, for example, decrement the weight of the rule by half its total weight. Further, when the local prediction is correct but the global outcome is incorrect, the learner method may measure the vote deficit for the actual prediction. After that, the learner method may increase the weights for rules that had the correct local prediction. In one embodiment, the weights of the correct-predicting rules are increased equally. This may boost the vote for the correct target value.

Additionally, when a rule (and the global outcome) predict correctly, the learner method may increment the weight of the correctly predicting rules conservatively. Such a method conjectures that this reward raises the confidence (weight) of the rule(s) for future predictions. In various embodiments, 0.1 is employed as the reward value. In other embodiments, different reward values may be employed. Liberally rewarding the rules eventually may lead to a drop in the performance, so this parameter may be selected carefully. Moreover, experiments appear to suggest a small linear increase in weight performs much better than exponential increase. In various embodiments, if the weight of any rule falls below a user-defined threshold, the rule is removed from the ruleset.

In some embodiments, if the antecedent of any rule matches the current instance but the target value selected or provided by the user is not present in the consequent, the learner method may update the rule by replacing the target value having the lowest frequency of correctly predicting an outcome with the current, user selected/provided target value. Further, in various embodiments, if the prediction is incorrect, the learner method may update the instance space by replacing the target value having the lowest frequency of correctly predicting an outcome with the current, user selected/provided target value. New rules may be generated in the same way as the initial rules, and redundancy may be removed. New rules may each be assigned a weight, for example, a weight of one.

The learner method of the calendar may then use this updated ruleset for subsequent instances. The ruleset is thus updated incrementally.

Experimental usage of the learner method has shown that at a relatively low cost in accuracy, a relatively significant improvement in the reduction in storage requirements may be realized. Further, even in this reduced storage environment, the learner method may execute at relatively high rate, making it appropriate for online usage.

FIG. 3 illustrates exemplary variable length rules comprising a part of a ruleset of the present invention, in accordance with various embodiments. As shown, rules may be comprised of antecedent if-clauses and consequent then-clauses, the if-clauses including one or more attributes, each attribute having one or more attribute values, and the then-clauses having one target, the target having one or more target values. As described above, each rule may be associated with a weight, and the target values may each be associated with a frequency metric. Further, a ruleset such as the ruleset depicted by FIG. 3 may be incrementally updated in the manner described above in reference to FIGS. 1 and 2.

FIG. 4 illustrates a viewer of a resource constrained device configured in accordance with an embodiment of the present invention, presenting the target values predicted by the learner to a user. As shown, a resource constrained device 402 of a type described above may have a viewer 404. Viewer 404 may be of any sort known in the art, including an LCD display, electronic paper, or a cathode ray tube. The resource constrained device 402 may also include a plurality of buttons to facilitate user interaction. Viewer 404 may present to the user a graphic view of data provided by an application enhanced with an embodiment of the learner of the present invention. The viewer 404 may present attributes and attribute values, and, as shown, may present a target and one or more predicted target values 406 which a user may select from. The list of target values 406 illustrated by FIG. 4 comprises three predictions. The viewer 404 also shows a cursor 408 highlighting one of the target values 406 to facilitate a user in selecting a target value. In other embodiments, the list 406 may also include a blank target value to facilitate a user in entering a different target value then any of those shown.

Figure 5:
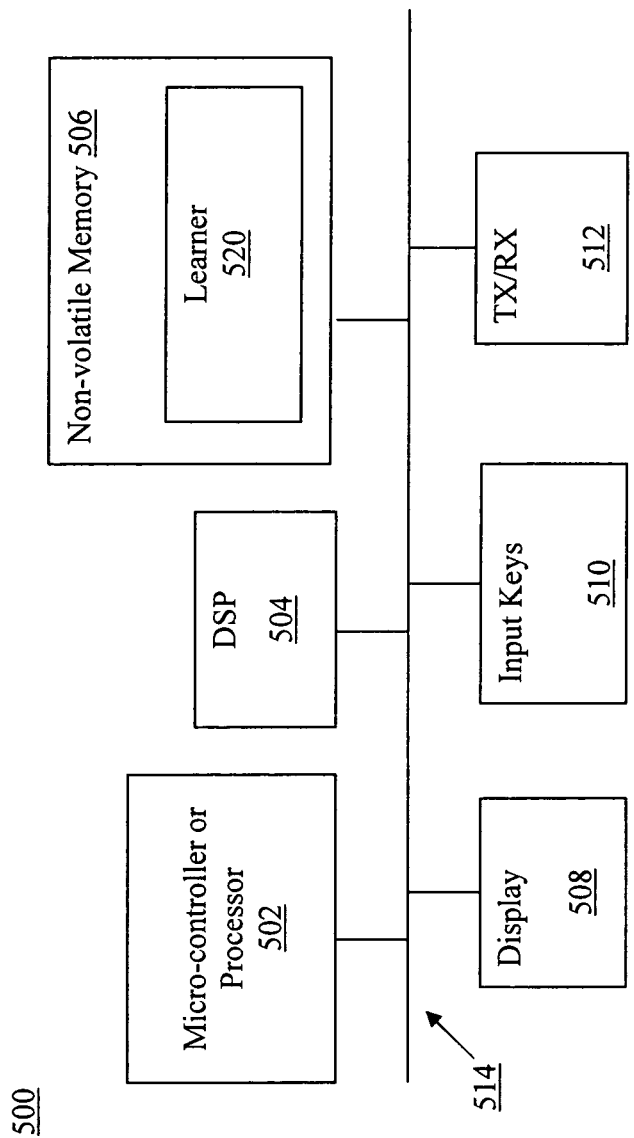
FIG. 5 illustrates an architectural view of a resource constrained device suitable for practice the present invention, in accordance with various embodiments.

FIG. 5 illustrates an architecture view of a resource constrained computing device 500, such as a mobile phone or a PDA, suitable for practicing the present invention, in accordance with various embodiments. As illustrated, for the embodiments, resource constrained computing device 500 includes elements found in conventional computing devices, such as micro-controller/processor 502, digital signal processor (DSP) 504, non-volatile memory 506, display 508, input keys 510 (such as a keypad or a select button), and transmit/receive (TX/RX) 512, coupled to each other via bus 514, which may be a single bus or a hierarchy of bridged buses (not shown). Further, non-volatile memory 506 includes learner 520 implementing the earlier described learning method of embodiments of the present invention, in and of itself/themselves or as part of one or more larger components. The implementation may be via any one of a number programming languages, assembly, C, and so forth.

In alternate embodiments, all or portions of the learner 520 may be implemented in hardware, firmware, or any combination thereof. Hardware implementations may be in the form of an application specific integrated circuit (ASIC), a reconfigured reconfigurable circuit (such as a Field Programming Field Array (FPGA)), and so forth.

The constitution of elements 502-514 are known in the art, and accordingly will not be further described.

Although specific embodiments have been illustrated and described herein, it will be appreciated by those of ordinary skill in the art that a wide variety of alternate and/or equivalent implementations may be substituted for the specific embodiments shown and described, without departing from the scope of the present invention. Those with skill in the art will readily appreciate that the present invention may be implemented in a very wide variety of embodiments or extended there from. For example, in various embodiments, the system may also be extended to provide confidence metrics for the predictions. This application is intended to cover any adaptations or variations of the embodiments discussed herein. Therefore, it is manifestly intended that this invention be limited only by the claims and the equivalents thereof.

What is claimed is:

1. A method for performing a learning process in an application for a mobile phone device comprising:
   creating, by a server, an instance set that includes one or more entries from a database of entries stored in a memory of said server;
   wherein said entries comprise a plurality of attributes with corresponding attribute values, and the one or more entries included in the instance set include a value for a target field;
   randomly selecting one or more entries from the instance set by the server, wherein the number of entries chosen is less than number of entries in the instance set;
   generating, by the server, one or more rules of variable length by randomly selecting attribute values corresponding to one or more field attributes of the randomly selected one or more entries;
   wherein said rules are constructed using at least one field attribute as a logical antecedent and at least one additional field attribute as a logical consequent;
   storing the generated rules in a rule set;
   retrieving the rule set by the mobile phone device;
   receiving at least one additional entry by the mobile phone device;
   registering one or more votes to predict an unknown field attribute value for said at least one additional received entry, the registering being performed in a weighted manner based at least in part on a weight and predicted target field values associated with a logical consequent of at least one of the one or more selected rules from said rule set whose logical antecedent has been determined to have been met, the logical meeting of the antecedent having been determined based at least in part on one or more field attributes values of the at least one additional received entry by said mobile phone;
   determining whether the predicted target field value, for which one or more votes are registered, correctly predicted the field attribute value of the received entry by said mobile phone; and
   adjusting the associated weight of the rule, incrementing the weight if the predicted target field value for which the one or more votes are registered correctly predicted the field attribute value of the received entry, and decrementing the weight if the predicted target field value for which the one or more votes are registered incorrectly predicted the field attribute value of the received entry by said mobile phone.

2. The method of claim 1, further comprising assigning, by said mobile phone, each of the one or more rules a weight, and wherein each of the one or more rules are initially assigned the same weight.

3. The method of claim 1, further comprising updating the one or more rules based on one or more additional entries, by the server.

4. The method of claim 1, wherein registering the one or more votes comprises registering, by a computer processor, a number of votes equal to the weight of each of the one or more rules, and wherein the one or more votes of each rule are registered for a most frequent target field value of each rule.

5. The method of claim 1, wherein registering the one or more votes comprises registering, by a computer processor, a number of votes equal to the weight of each of the one or more rules, and wherein the one or more votes of each rule are registered for each of one or more target field values of each rule, each vote for each target field value being equal to the weight of each rule multiplied by a fractional frequency of that target field value.

6. The method of claim 1, further comprising predicting, by a computer processor, the field value for the attribute of the received entry based on an aggregation of the votes registered, and wherein the predicted field value is the same as a target field value that received the highest plurality of votes.

7. The method of claim 1, further comprising predicting, by said mobile phone, a plurality of field values for the attribute of the received entry based on an aggregation of the votes registered, and wherein the predicted plurality of field values includes a plurality of target field values receiving the highest pluralities of votes, and wherein a size of the plurality of target field values corresponds to a threshold.

8. The method of claim 1, wherein determining whether the predicted target field value for which one or more votes are registered correctly predicted the field attribute value of the received entry comprises presenting the predicted field value to a user, and facilitating the user in selecting the predicted field value or in entering a different field value, by a computer processor.

9. The method of claim 1, further comprising eliminating, by a computer processor, one of the one or more rules if the weight of the rule has decreased below a threshold metric.

10. A mobile phone configured to learn rules regarding field attribute values and configured to use learned rules to predict field attribute values comprising:
   a hardware processor; and
   a computing engine coupled to the hardware processor and adapted to communicate with a server; wherein the server creates an instance set that includes one or more entries from a database of entries stored in a memory of the server;
   wherein said entries comprise a plurality of attributes with corresponding attribute values, and the one or more entries included in the instance set include a value for a target field;
   wherein the server randomly selects one or more entries from the instance set, wherein the number of entries chosen is less than number of entries in the instance set;
   generate one or more rules of variable length by randomly selecting attribute values corresponding to one or more field attributes of the randomly selected one or more entries, wherein said rules are constructed using at least one field attribute as a logical antecedent and at least one additional field attribute as a logical consequent;
   retrieving the rule set by the mobile phone device from the server;
   receive at least one additional entry at the mobile device;
   register one or more votes to predict an unknown field attribute value for said at least one additional received entry, the registering being performed in a weighted manner based at least in part on a weight and predicted target field values associated with a logical consequent of at least one of the one or more selected rules from said rule set whose logical antecedent has been determined to have been met, the logical meeting of the antecedent having been determined based at least in part on one or more attributes values of the at least one additional received entry;
   determine whether the predicted target field value for which one or more votes are registered correctly predicted the attribute value of the received entry; and
   adjust the associated weight of the rule, incrementing the weight if the predicted target field value for which the one or more votes are registered correctly predicted the field attribute value of the received entry, and decrementing the weight if the predicted target field value for which the one or more votes are registered incorrectly predicted the field attribute value of the received entry.

11. The mobile phone of claim 10, wherein the computing engine is further adapted to register the one or more votes, and the registering comprises registering a number of votes equal to a weight of each of the one or more rules.

12. The mobile phone of claim 10, wherein the computing engine is further adapted to predict the field value for the field attribute of the received entry based on an aggregation of the votes registered, and the predicted field value is the same as a target field value that received the highest plurality of votes.

13. The mobile phone of claim 10, wherein the computing engine is further adapted to predict a plurality of field values for the field attribute of the received entry based on an aggregation of the votes registered, and the predicted plurality of values includes a plurality of target field values receiving the highest pluralities of votes, and a size of the plurality of target field values corresponds to a threshold metric.

14. The mobile phone of claim 10, wherein the computing engine is further adapted to eliminate one of the one or more rules if the weight of the rule has decreased below a threshold metric.

* * * * *